United States Patent
Lee et al.

(10) Patent No.: US 10,424,223 B2
(45) Date of Patent: Sep. 24, 2019

(54) BRAILLE ACTUATOR AND BRAILLE OUTPUTTING DEVICE USING SAME

(71) Applicant: OHFATECH, INC, Gumi-si, Gyeongsangbuk-do (KR)

(72) Inventors: Kyoung Hwang Lee, Gyeonggi-do (KR); Jae Ryun Cho, Anyang-si (KR); Min Sung Son, Seoul (KR); Hang Sok Kim, Goyang-si (KR)

(73) Assignee: OHFATECH, INC, Gumi-si, Gyeongsangbuk-Do (KR)

( * ) Notice: Subject to any disclaimer, the term of this patent is extended or adjusted under 35 U.S.C. 154(b) by 169 days.

(21) Appl. No.: 15/322,319

(22) PCT Filed: Mar. 22, 2016

(86) PCT No.: PCT/KR2016/002872
§ 371 (c)(1),
(2) Date: Feb. 5, 2018

(87) PCT Pub. No.: WO2016/159553
PCT Pub. Date: Oct. 6, 2016

(65) Prior Publication Data
US 2018/0357924 A1    Dec. 13, 2018

(30) Foreign Application Priority Data
Mar. 27, 2015   (KR) .......................... 10-2015-0043111

(51) Int. Cl.
G09B 21/00   (2006.01)
(52) U.S. Cl.
CPC ........... G09B 21/004 (2013.01); G09B 21/00 (2013.01)
(58) Field of Classification Search
CPC ................................ G09B 21/004; G09B 21/00
See application file for complete search history.

(56) References Cited

U.S. PATENT DOCUMENTS

| | | | | |
|---|---|---|---|---|
| 2010/0159423 A1* | 6/2010 | Hashizume | ............ | G06F 3/016 434/114 |
| 2013/0017516 A1* | 1/2013 | Tyler | ..................... | G04B 25/02 434/114 |
| 2015/0379895 A1* | 12/2015 | Chari | .................. | G09B 21/004 434/114 |

FOREIGN PATENT DOCUMENTS

KR    20-1999-0036221    9/1999
KR    10-2010-0051290    5/2010
(Continued)

OTHER PUBLICATIONS

International Search Report for International Application No. PCT/KR2016/002872, dated Jun. 16, 2016.
(Continued)

*Primary Examiner* — Corbett B Coburn
(74) *Attorney, Agent, or Firm* — Kile Park Reed & Houtteman PLLC

(57) ABSTRACT

Provided are a braille actuator and a braille outputting device using the same. The braille actuator includes an electromagnet, a rotation member, and a braille protrusion. With this configuration, the actuator applies a current to the electromagnet to allow the electromagnet to exert a repulsive force or attractive force on the permanent magnet of the rotation member, so that the rotation member is rotated, and due to the rotation of the rotation member, the upper surface of the rotation member allows the lower surface of the braille protrusion to be moved upward, and the braille protrusion is protruded. After that, even though the supplying of the current to the electromagnet is blocked, the braille protrusion is supported by the rotation member, and thus, the output state is maintained, so that it is possible to greatly reduce power consumption for output of braille.

12 Claims, 8 Drawing Sheets

(56) References Cited

FOREIGN PATENT DOCUMENTS

| | | |
|---|---|---|
| KR | 10-2012-0020641 | 3/2012 |
| KR | 10-1168142 | 7/2012 |
| KR | 10-1181811 | 9/2012 |

OTHER PUBLICATIONS

English translation of the Written Opinion of International Application No. PCT/KR2016/002872, dated Oct. 3, 2017.

* cited by examiner (a)

(b)

(a)

(b)

(c)

BRAILLE ACTUATOR AND BRAILLE OUTPUTTING DEVICE USING SAME

TECHNICAL FIELD

The present invention relates to a braille actuator and a braille outputting device using the braille actuator.

BACKGROUND ART

Recently, various portable electronic devices such as smart phones and smart pads are rapidly spreading, and people can search and browse information that they want anytime and anywhere. However, since such a general portable electronic device is designed for normal persons, there is a problem that it is difficult for visually impaired persons to use the device.

In recent years, devices for providing information to the visually impaired persons have been developed, and a representative example thereof is a braille watch. The braille watch is a device that allows a visually impaired person to detect the braille protrusions protruded on the surface of the watch so as to recognize time. The braille watch uses a permanent magnet and an electromagnet to apply current to the electromagnet installed around a to-be-protruded braille protrusion so as to generate a repulsive force or attractive force between the electromagnet and the permanent magnet, so that information is output.

However, in the case of most of braille outputting devices using the electromagnets such as a braille watch, since the braille protrusion is required to maintain the protruded state while the user reads the braille, the current needs to be continuously supplied to the electromagnet to maintain the state of the electromagnet. In addition, since the braille protrusion is required to maintain the protruded state even when the user touches the braille to apply the force in a direction opposite to the protruding direction of the braille protrusion, a relatively high current needs to be continuously supplied to the electromagnet. Therefore, power consumption is large. Accordingly, such a technique of the related art has a problem that it is difficult to apply the technique to a portable electronic device which uses a limited battery power.

DISCLOSURE

Technical Problem

The present invention is to provide a braille actuator capable of protruding braille protrusions and maintain the protruded state with small power consumption and a braille outputting device using the braille actuator

Technical Solution

According to an exemplary embodiment of the present invention, there is provided a braille actuator including: an electromagnet which is installed on a bottom surface and of which polarity is changed according to a flow of current; a rotation member which has an upper surface formed to be an inclined surface and a lower surface on which a permanent magnet is installed and which is rotated by an attractive force or a repulsive force being exerted between the permanent magnet and the electromagnet; and a braille protrusion which has a lower surface formed to be an inclined surface so as to be in contact with the inclined surface of the rotation member and which is moved upward or downward along the inclined surface of the rotation member if the rotation member is rotated.

In addition, in the braille actuator according to another exemplary embodiment of the present invention, a guide member may be formed on a side surface of the braille protrusion so as to prevent rotation of the braille protrusion and allow the braille protrusion to perform only upward and downward movement.

In addition, in the braille actuator according to another exemplary embodiment of the present invention, the braille actuator may further include a housing for accommodating the rotation member and the braille protrusion, wherein a guide hole is formed in the longitudinal direction at a position corresponding to the guide member of the housing to be engaged with the guide member.

In addition, in the braille actuator according to another exemplary embodiment of the present invention, the rotation member may be rotated by 180 degrees.

In addition, in the braille actuator according to another exemplary embodiment of the present invention, the rotation member and the braille protrusion may be formed in a cylindrical shape, and the electromagnet and the permanent magnet may be arranged in a circular shape along a circumference of a cross section of the rotation member.

In addition, in the braille actuator according to another exemplary embodiment of the present invention, a sum of circumferential lengths of the electromagnet and the permanent magnet may be 50% of the circumferential length of the rotation member.

In addition, in the braille actuator according to another exemplary embodiment of the present invention, the electromagnet may be configured to include a first electromagnet and a second electromagnet, and a current may be supplied to the first electromagnet and the second electromagnet so that the surfaces facing each other and the surfaces opposite to each other have the same polarities.

In addition, in the braille actuator according to another exemplary embodiment of the present invention, cut surfaces may be horizontally formed at a highest point of the upper surface of the rotation member and a lowest point of the lower surface of the braille protrusion so that the cut surface of the rotation member and the cut surface of the braille protrusion are in contact with each other to be supported in the state where the braille protrusion is protruded.

In addition, in the braille actuator according to another exemplary embodiment of the present invention, the braille protrusion may further include a center shaft passing through a center of the rotation member and the braille protrusion.

In addition, in the braille actuator according to another exemplary embodiment of the present invention, an edge of the upper surface of the rotation member and an edge of a lower surface of the braille protrusion may be formed to be rounded.

According to another aspect of the present invention, there is provided a braille outputting device including: a base where a plurality of cells are formed; the braille actuator which is installed in each of the cells; a cover which is engaged with the base; and a driver circuit which supplies a current to the electromagnet of the braille actuator installed in each of the cells according to information to be output to a user and controlling the braille actuator installed in each of the cells.

Advantageous Effects

According to the present invention, a braille actuator is configured to include: an electromagnet which is installed on a bottom surface and of which polarity is changed according to a flow of current; a rotation member which has an upper surface formed to be an inclined surface and a lower surface on which a permanent magnet is installed and which is rotated by an attractive force or a repulsive force being exerted between the permanent magnet and the electromagnet; and a braille protrusion which has a lower surface formed to be an inclined surface so as to be in contact with the inclined surface of the rotation member and which is moved upward or downward along the inclined surface of the rotation member if the rotation member is rotated. With this configuration, the actuator applies a current to the electromagnet to allow the electromagnet to exert a repulsive force or attractive force on the permanent magnet of the rotation member, so that the rotation member is rotated, and due to the rotation of the rotation member, the upper surface of the rotation member allows the lower surface of the braille protrusion to be moved upward, and the braille protrusion is protruded. After that, even though the supplying of the current to the electromagnet is blocked, the braille protrusion is supported by the rotation member, and thus, the output state is maintained, so that it is possible to greatly reduce power consumption for output of braille

BEST MODE

Hereinafter, exemplary embodiments of the present invention will be described with reference to the attached drawings.

Figure 1:
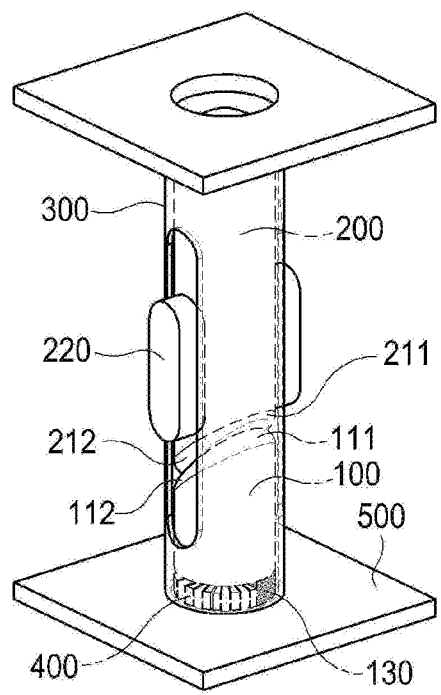
FIG. 1 is a diagram illustrating the overall configuration of a braille actuator according to an exemplary embodiment of the present invention.
Figure 1:
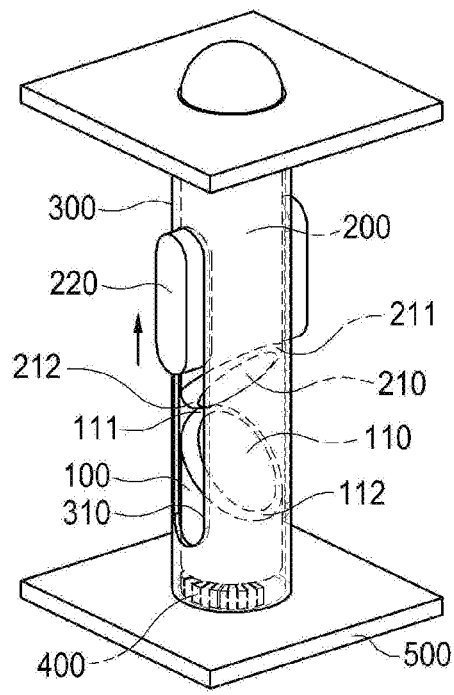

FIG. 1 is a diagram illustrating the overall configuration of a braille actuator according to an exemplary embodiment of the present invention.

Referring to FIG. 1, the braille actuator of the present invention is configured to basically include an electromagnet 400, a rotation member 100, and a braille protrusion 200, and the braille actuator may be configured to further include a housing 300.

First, the electromagnet 400 is fixedly installed on a bottom surface 500 of the braille actuator, and the polarity of the electromagnet is changed according to the direction of an incoming current. The electromagnet 400 may be realized by a general electromagnet 400 having a coil wound around a magnetic core such as an iron core.

The rotation member 100 is a member having an upper surface 110 formed as a slope and a lower surface 120 where the permanent magnet 130 is installed. The permanent magnet 130 installed on the lower surface exerts an attractive or repulsive force on the electromagnet 400 to be rotated in a clockwise or counterclockwise direction, so that the rotation member allows the braille protrusion 200 to be moved upward or downward. The configuration of the rotation member 100 will be described more in detail with reference to FIG. 2.

The braille protrusion 200 is formed so that the lower surface 210 is an inclined surface so as to be in contact with the inclined surface of the rotation member 100. When the rotation member 100 is rotated, the braille protrusion 200 is moved upward or downward along the inclined surface of the rotation member 100. An inclination angle of the inclined surface of the braille protrusion 200 is formed to be equal to the inclination angle of the inclined surface of the rotation member 100, so that the inclined surface of the braille protrusion 100 and the inclined surface of the braille protrusion 200 are in close contact with each other. However, it is not necessary that the both inclined surfaces are completely in close contact with each other.

In addition, a guide member 220 is formed on the side surface of the braille protrusion 200 to prevent the braille protrusion 200 from rotating together with the rotation member 100 and to allow the braille protrusion 200 to perform only up and down movement.

The braille actuator according to the present invention may be configured to further include a housing 300 accommodating the braille protrusion 200 and the rotation member 100. As illustrated in FIG. 1, in a side surface of the housing 300, a guide hole 310 with which the guide member 220 is engaged is formed in the longitudinal direction at a position corresponding to the guide member 220 formed on the side surface of the braille protrusion 200.

The operations of the braille actuator according to the present invention will be described with reference to FIG. 1. First, in the state where the braille is not protruded (refer to (a) of FIG. 1), the inclined surface as the upper surface 110 of the rotation member 100 and the inclined surface as the lower surface 210 of the braille protrusion 200 are in close contact with each other. The state where the braille is not protruded is the state where the current is not supplied to the electromagnet 400. In this state, the highest point 111 of the upper surface 110 of the rotation member 100 is in contact with or is aligned on a straight line with the highest point 211 of the lower surface 210 of the braille protrusion 200, and the lowest point 112 of the upper surface 110 of the rotation member 100 is in contact with or is aligned on a straight line with the lowest point 212 of the lower surface 210 of the braille protrusion.

After that, in the case where the braille protrusion 200 is to be protruded, the permanent magnet 130 installed on the lower surface 120 of the rotation member 100 and the electromagnet 400 are allowed to exert an attractive force or a repulsive force on each other by supplying a current to the electromagnet 400 fixedly installed on the bottom surface 500, so that the rotation member 100 is rotated by 180 degrees.

When the rotation member 100 is rotated, the orientation of the inclined surface formed on the upper surface 110 is rotated by 180 degrees. In this process, as illustrated in (b) of FIG. 1, while the upper surface of 110 of the rotation member 100 and the lower surface 210 of the braille protrusion 200 which are in close contact with each other are deviated from each other, the inclined surface 110 of the rotation member 100 allows the inclined surface 210 of the braille protrusion 200 to be moved upward, so that the braille protrusion 200 is protruded outward. In the state where the braille protrusion 200 is protruded, the highest point 111 of the upper surface 110 of the rotation member 100 is in contact with or aligned on a straight line with the lowest point 212 of the lower surface 210 of the braille protrusion 200, and the lowest point 112 of the upper surface 110 of the rotation member 100 is aligned on a straight line with the highest point 211 of the lower surface 210 of the braille protrusion 200.

When the rotation is completed, the supplying of the current to the electromagnet 400 is blocked. Even though the supplying of the current is blocked, the rotation member 100 maintains the current state by a surplus magnetic force remaining in the electromagnet 400 and a frictional force with the bottom surface 500, and the braille protrusion 200 is also supported by the rotation member 100 due to a frictional force with the rotation member 100, so that the protruded state is maintained.

In addition, even though the user applies a pressure to the braille protrusion 200 from the top to the bottom, since the applied pressure is transmitted in the vertical direction, the braille protrusion is supported by the rotation member 100 which maintains the fixed state, so that the protruded state is maintained.

On the other hand, in order to return the protruded braille protrusion 200 to the original state as illustrated in (a) of FIG. 1, the current is supplied so that the polarity of the electromagnet 400 is opposite to the polarity in the case of protruding the braille protrusion 200. Then, the rotation member 100 is rotated in the direction opposite to the direction in the case of protruding the braille protrusion 200, so that the protruded braille protrusion 200 is also moved downward and returned to the original state as illustrated in (a) of FIG. 1.

Thus, only when the state of the braille protrusion 200 is changed, that is, when the braille protrusion 200 is protruded or when the protruded braille protrusion 200 is inserted into the inside, the current is supplied. When the state where the braille protrusion is protruded is maintained, no current is supplied. Therefore, it is possible to remarkably reduce power consumption as compared with the related art.

On the other hand, in the exemplary embodiment of the present invention, the edge of the upper surface of the rotation member 100 and the edge of the lower surface 210 of the braille protrusion 200 may be formed to be rounded so that the braille protrusion 200 can be smoothly moved upward while the frictional force with the braille protrusion 200 is reduced when the rotation member 100 is rotated.

Figure 2A:
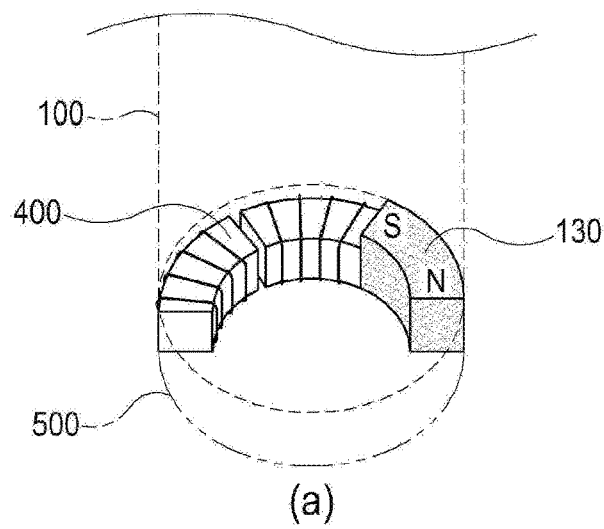
FIG. 2A is a diagram illustrating a structure of an electromagnet fixedly installed on a bottom surface and a permanent magnet installed in a rotation member according to a first exemplary embodiment of the present invention.
Figure 2A:
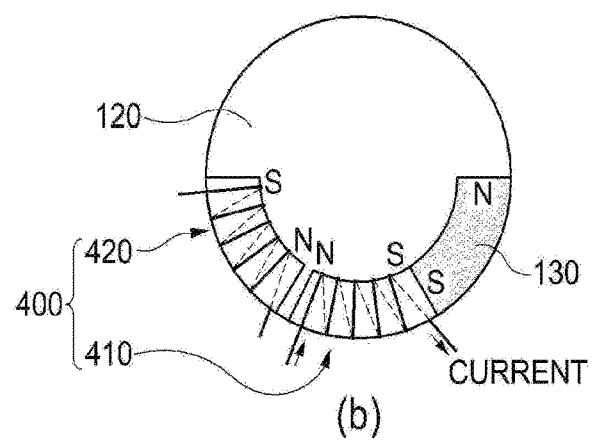
Figure 2A:
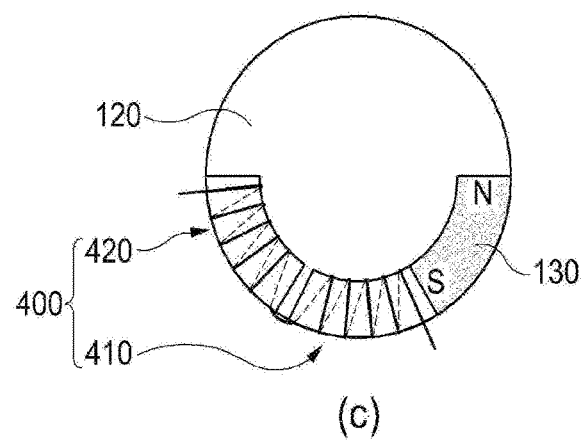
Figure 2B:
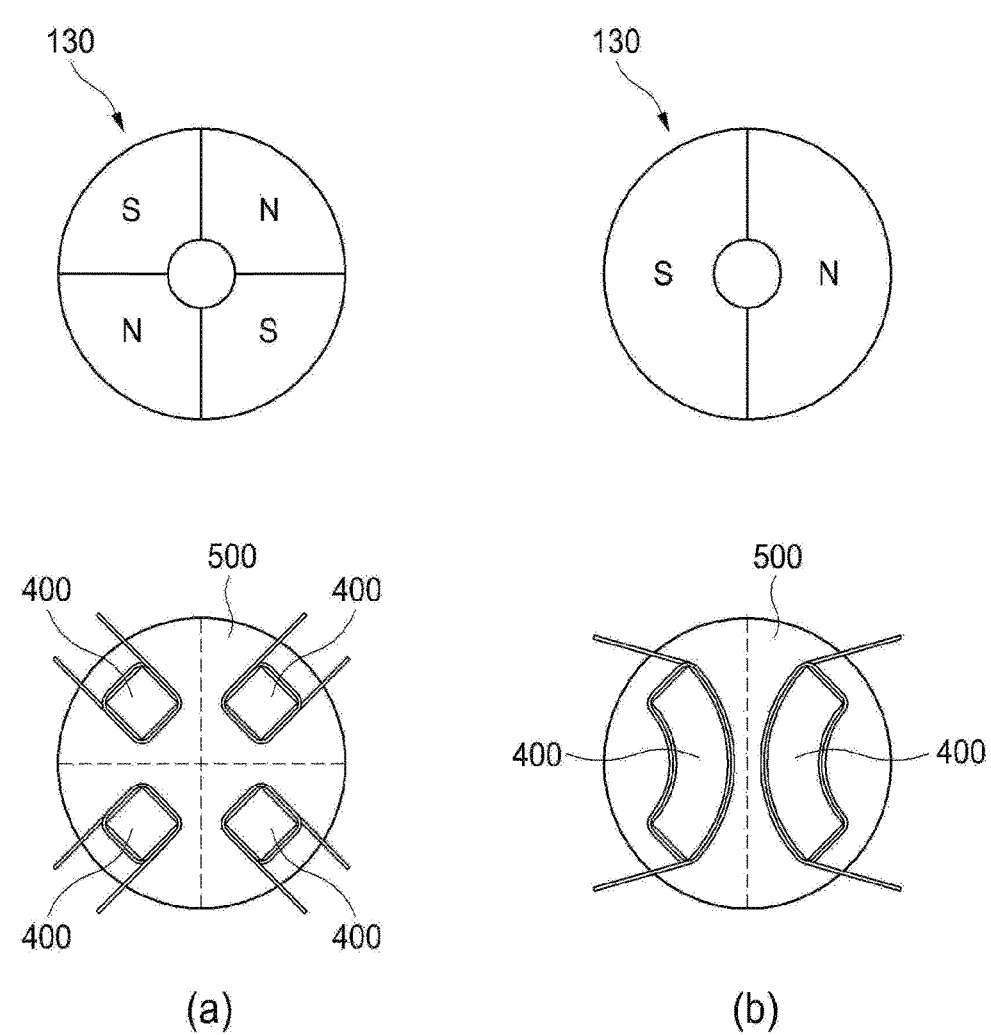
FIG. 2B is a diagram illustrating a structure of an electromagnet fixedly installed on a bottom surface and a permanent magnet installed in a rotation member according to a second exemplary embodiment of the present invention.

FIGS. 2A and 2B illustrate a structure of the electromagnet 400 fixedly installed on the bottom surface 500 and the permanent magnet 130 installed on the rotation member 100 according to first and second exemplary embodiments of the present invention.

First, the first embodiment will be described with reference to FIG. 2A. The braille protrusion 200 and the rotation member 100 according to the present invention are formed in a cylindrical shape, and the electromagnet 400 and the permanent magnet 130 are formed in a circular shape along the circumference of the cross section of the rotation member 100. The sum of the circumferential lengths of the electromagnet 400 and the permanent magnet 130 is 50% of the circumferential length of the rotation member 100. Therefore, the rotation member 100 is rotatable by 180 degrees.

The electromagnet 400 according to the present invention is configured to include two electromagnets 400 (a first electromagnet 410 and a second electromagnet 420) as illustrated in (b) and (c) of FIG. 2A. As illustrated in (a) of FIG. 1, the first electromagnet 410 is in contact with the permanent magnet 130 in the state where the braille protrusion 200 is accommodated and is in close contact with the rotation member 100. As illustrated in (b) of FIG. 1, the second electromagnet 420 is in contact with the permanent magnet 130 in the state where the braille protrusion 200 is protruded.

Herein, as illustrated in (b) of FIG. 2A, the first electromagnet 410 and the second electromagnet 420 may be configured to be provided with respective magnetic cores and electric wires wound around the magnetic cores. By controlling the directions of current supplied to the electromagnets 400, the directions of the respective lines of magnetic force can be opposite to each other (namely, so that the facing poles have the same polarity).

In addition, as illustrated in (c) of FIG. 2A, the first electromagnet 410 and the second electromagnet 420 may be configured so that only magnetic cores are separated from each other and a wire is wound around the magnetic cores so that the wire is shared and only the directions of lines of magnetic force are opposite to each other.

Hereinafter, an example implemented by using the first electromagnet 410 and the second electromagnet 420 illustrated in (c) of FIG. 2A will be described. It can be understood by the skilled in the art that the driving method of the example illustrated in (b) of FIG. 2A is the same as the driving method using the electromagnets 400 illustrated in (c) of FIG. 2A except that the polarities are controlled by controlling the directions of currents supplied to the first electromagnet 410 and the second electromagnet 420.

On the other hand, the second embodiment illustrated in FIG. 2B will be described. The braille protrusion 200 and the rotation member 100 are formed in a cylindrical shape. The permanent magnet 130 is formed or installed on the entire lower surface of the rotation member 100 so that the N pole and the S pole are alternately arranged so as to be directed in the direction perpendicular to the lower surface of the rotation member 100.

In the example illustrated in (a) of FIG. 2B, four permanent magnets 300 are formed or installed on the lower surface of the rotation member 100 so that the polarities are alternately arranged, and four electromagnets 400 are also fixedly installed on the bottom surface 500 being in contact with the permanent magnets 300 so as to correspond to the polarities of the permanent magnets 300.

In the example illustrated in (b) of FIG. 2B, two permanent magnets 300 are formed or installed on the lower surface of the rotation member 100 so that different polarities are arranged, and two electromagnets 400 are also fixedly installed on the bottom surface 500 being in contact with the permanent magnets 300 so as to correspond to the polarities of the permanent magnets 300.

Figure 3:
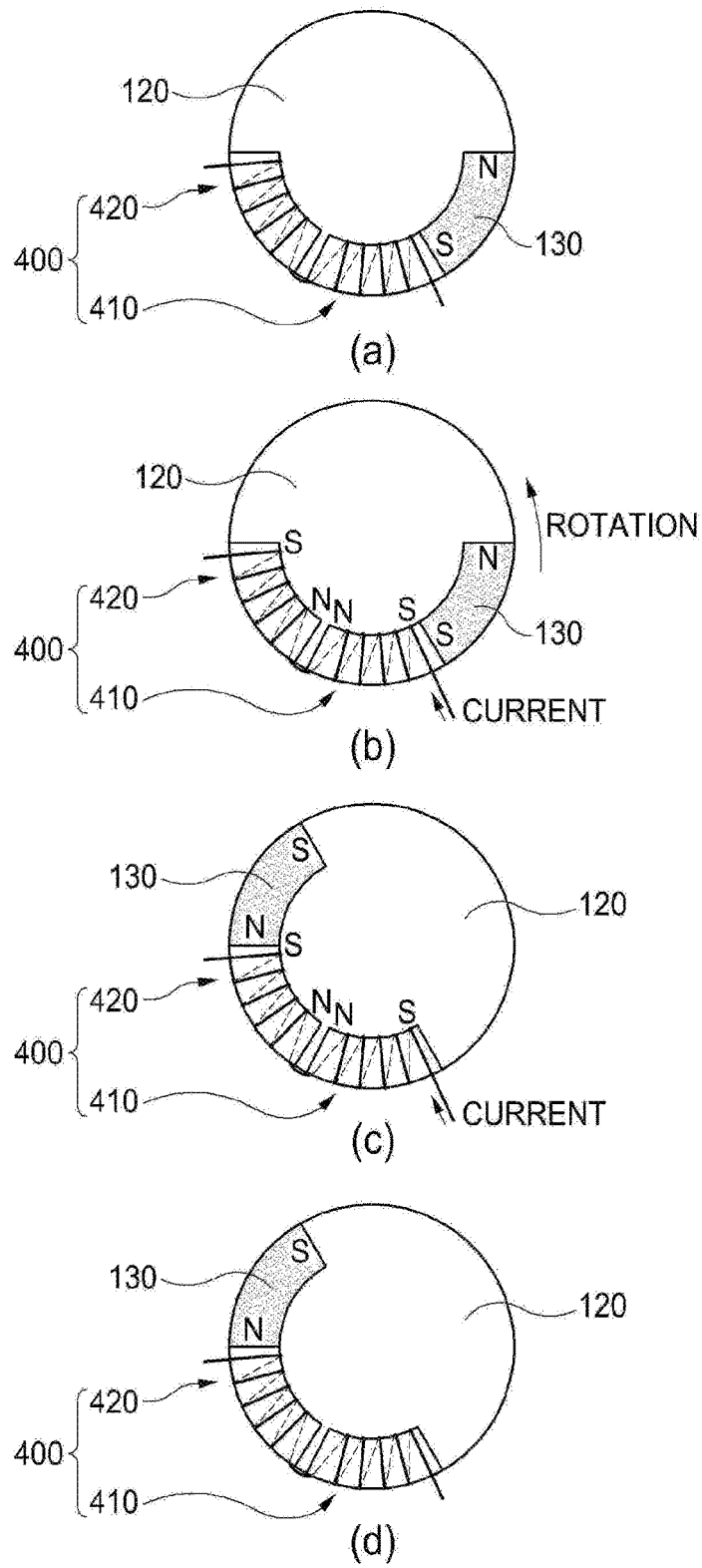
FIG. 3 is a diagram for explaining a rotation mode of the rotation member of the present invention according to the exemplary embodiment of the present invention.

FIG. 3 is a diagram for explaining a rotation mode of the rotation member 100 according to the exemplary embodiment of the present invention. Hereinafter, the mode where the rotation member 100 according to the present invention is rotated will be described with reference to the first embodiment illustrated in FIG. 2A.

Referring to FIG. 3, in the state illustrated in (a) of FIG. 1, as illustrated in (a) of FIG. 3, no current is supplied to all the electromagnets 400, and thus, the electromagnets 400 have no polarity. The permanent magnet 130 installed in the rotation member 100 is in contact with the first electromagnet 410.

At this time, as illustrated in (b) of FIG. 1, in order to move the braille protrusion 200 upward to be protruded outward by rotating the rotation member 100 by 180 degrees, a current is supplied so that the contact surface of the first electromagnet 410 to the permanent magnet 130 exerts a repulsive force on the permanent magnet 130 and one surface of the second electromagnet 420 opposite to the contact surface of the first electromagnet 410 has the same polarity as that of the contact surface of the first electromagnet 410 to exert an attractive force on the permanent magnet 130.

Referring to (b) of FIG. 3, since the polarity of the permanent magnet 130 being in contact with the contact surface of the first electromagnet 410 is the S pole, if a current is supplied to the first electromagnet 410 so that the S pole is formed in the contact surface of the first electromagnet 410, a repulsive force is exerted between the first electromagnet 410 and the permanent magnet 130, and thus, the rotation member 100 starts to be rotated in the arrow direction.

Due to the rotation of the permanent magnet 130, an attractive force is exerted between the S pole of the second electromagnet 420 and the N pole of the permanent magnet 130, and the N pole of the permanent magnet 130 is in contact with the S pole of the second electromagnet 420, so that the rotation member 100 is rotated by 180 degrees (refer to (c) of FIG. 3).

Finally, if the permanent magnet 130 is in contact with the second electromagnet 420, namely, if the braille protrusion 200 is moved upward to be protruded outward, the current supplied to the electromagnet 400 is blocked, and the protruded state of the braille protrusion 200 is maintained by the supporting of the rotation member 100 (refer to (d) of 3).

On the other hand, it can be understood that, in the case where the first electromagnet 410 and the second electromagnet 420 do not share winding wires and wires are individually wound so as to individually control the polarities, in the state where the braille protrusion 200 is accommodated, if a current is supplied so that the S pole is formed on the contact surface of the first electromagnet 410 being in contact with the S pole of the permanent magnet 130 and the S pole is also formed on the opposite surface of the second electromagnet 420, the rotation member 100 is rotated in the same manner as illustrated in FIG. 3.

On the other hand, in the case where the driving circuit driving the actuator according to the present invention can control supplying of a current in several milliseconds, the actuator can be operated by using only one electromagnet 400. More specifically, in the state illustrated in (a) of FIG. 3, in the case where only one electromagnet 400 having the same length as the length connecting the first electromagnet 410 and the second electromagnet 420 exists, an instantaneous current pulse is applied so that the S pole is formed on the surface of the electromagnet 400 being in contact with the S pole of the permanent magnet 130. It is preferable that the intensity of the current pulse applied at the time is larger than the intensity of the current illustrated in FIG. 3.

If the S pole is instantaneously formed on the contact surface of the electromagnet 400, the permanent magnet 130 starts to be rotated by a repulsive force, and even though the polarity formed on the electromagnet 400 disappears after the duty cycle of the pulse is ended, the permanent magnet 130 continues to be rotated by inertia. At the time when the permanent magnet 130 is moved over 50% of the entire circumferential length where the permanent magnet needs to be moved, a current is supplied in the direction opposite to the direction of the previously supplied current so that the S pole exerts a force on the opposite surface of the electromagnet 400. Then, an attractive force is exerted between the N pole of the permanent magnet 130 and the S pole formed on the opposite surface of the electromagnet 400, and thus, the N pole of the permanent magnet 130 is in contact with the opposite surface of the electromagnet 400. Therefore, the permanent magnet 130 and the rotation member 100 where the permanent magnet 130 is installed are rotated by 180 degrees, and thus, the braille protrusion 200 is protruded outward. In this example, the intensity and width of the initially applied current pulse, the time difference for supplying the current in the direction different from the applied current pulse, and the like can be defined in advance through calculations and experiments in consideration of the weight, material, and the like of the rotation member 100.

On the other hand, the second embodiment illustrated in FIGS. 2A and 2B is different from the first embodiment in terms of the arrangement of the electromagnet 400 and the permanent magnet 130. The technical idea of the rotation of the permanent magnet is the same, and thus, the detailed description thereof will be omitted.

Figure 4:
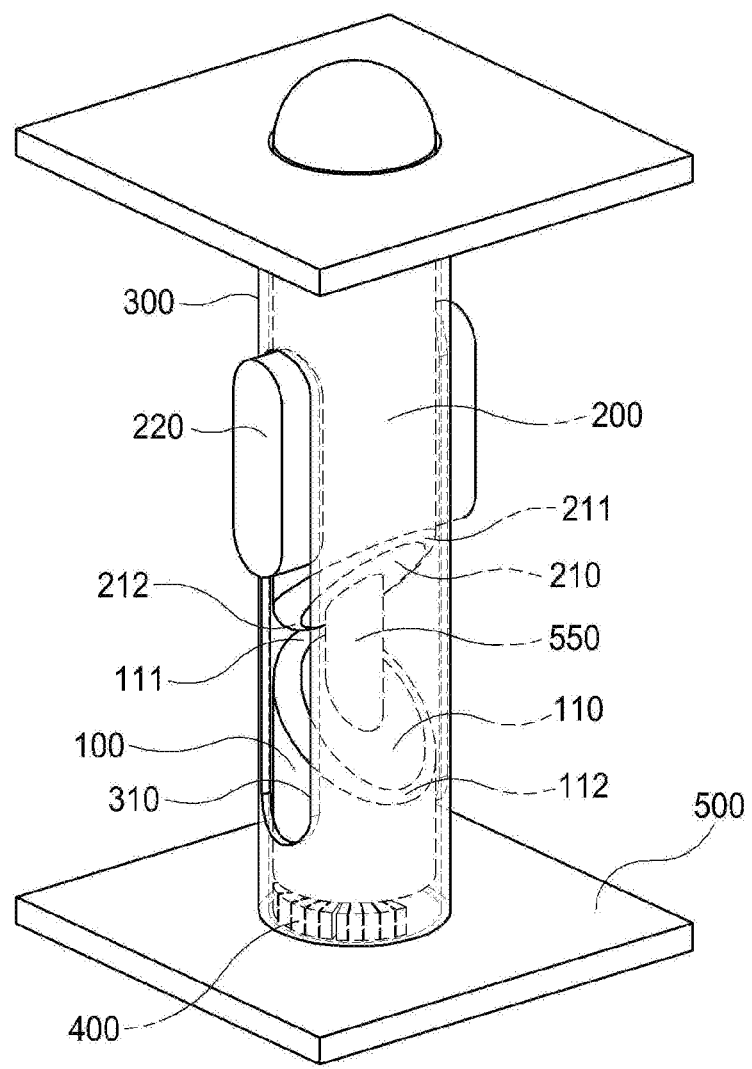
FIG. 4 is a diagram illustrating a structure of a braille actuator according to another embodiment of the present invention.

On the other hand, in another exemplary embodiment of the present invention illustrated in FIG. 4, a center shaft 550 which is formed vertically from the bottom surface 500 to pass through the center of the rotation member 100 and the braille protrusion 200 may be further included. Therefore, it is possible to minimize the influence of a frictional force caused by the contact of the rotation member 100 to the side surface of the housing 300 while the rotation member is rotated, and it is possible to minimize the influence of a frictional force caused by the contact of the braille protrusion 200 to the side surface of the housing 300 which the braille protrusion is rotated cooperatively. At this time, it is preferable that lubricant is applied on the center shaft 550 so that the frictional force between the center shaft 550 and the rotation member 100 and between the center shaft 550 and the braille protrusion 200 can be minimized.

Figure 5:
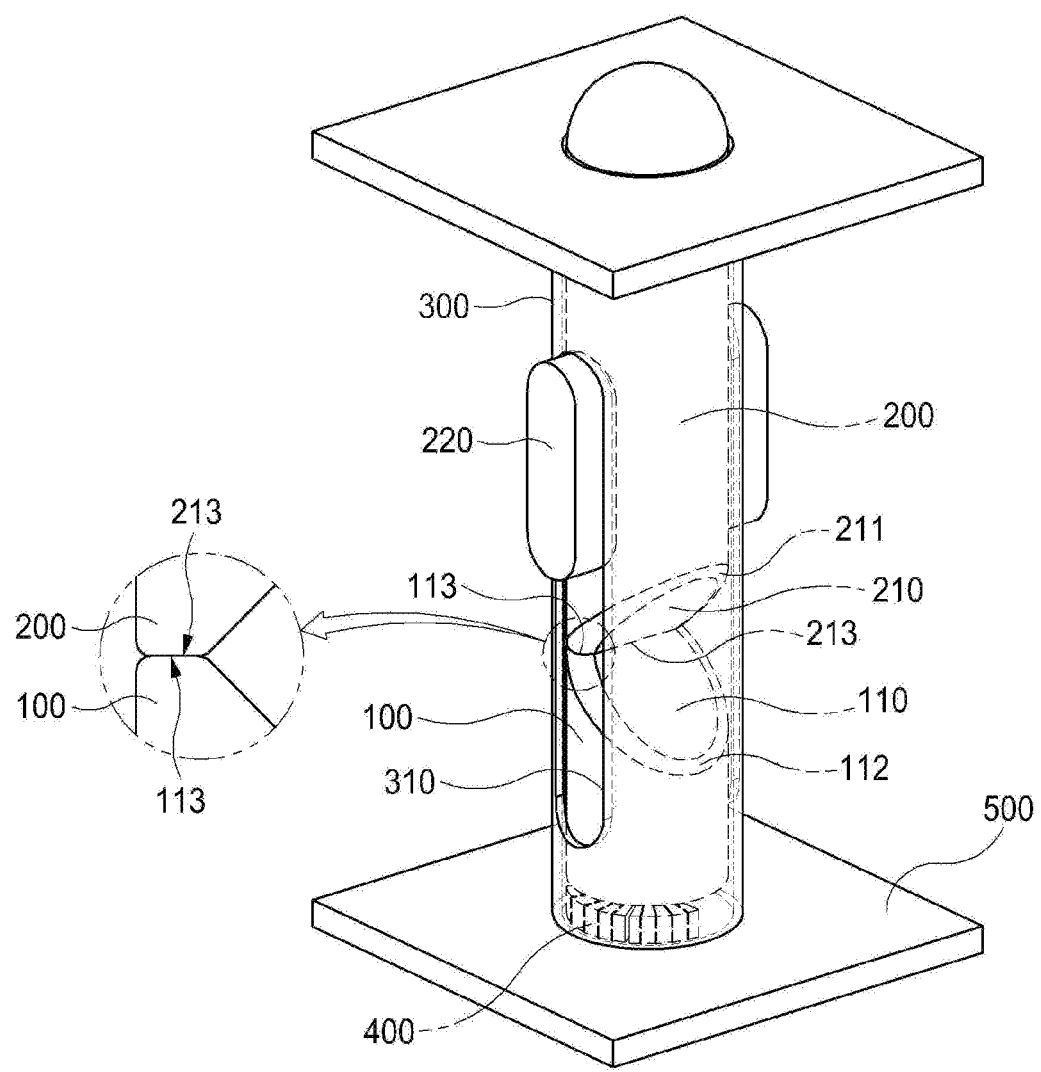
FIG. 5 is a diagram illustrating a structure of a braille actuator according to still another embodiment of the present invention.

On the other hand, in another exemplary embodiment illustrated in FIG. 5, cut surfaces 113 and 213 may be formed horizontally on the highest point 111 of the upper surface 110 of the rotation member 100 and the lowest point 112 of the lower surface 210 of the braille protrusion 200 so that the protruded state where the braille protrusion 200 is protruded by rotating the rotation member 100 is more strongly maintained.

As illustrated in FIG. 5, if the cut surfaces 113 and 213 may be formed horizontally on the highest point 111 of the upper surface 110 of the rotation member 100 and the lowest point 112 of the lower surface 210 of the braille protrusion 200, in the state where the braille protrusion is protruded, the two cut surfaces 113 and 213 are in contact with each other, and thus, a frictional force is generated. Therefore, even in the case where the braille protrusion 200 is slightly rotated by a user slightly touching the braille protrusion 200, the braille protrusion is supported by the cut surfaces 113 and 213, so that it is possible to preventing the braille protrusion from being moved downward along the inclined surface. However, in this case, in consideration of the frictional force of the cut surfaces, the electromagnet 400 needs be stronger than that of the case where there is no cut surface.

Figure 6A:
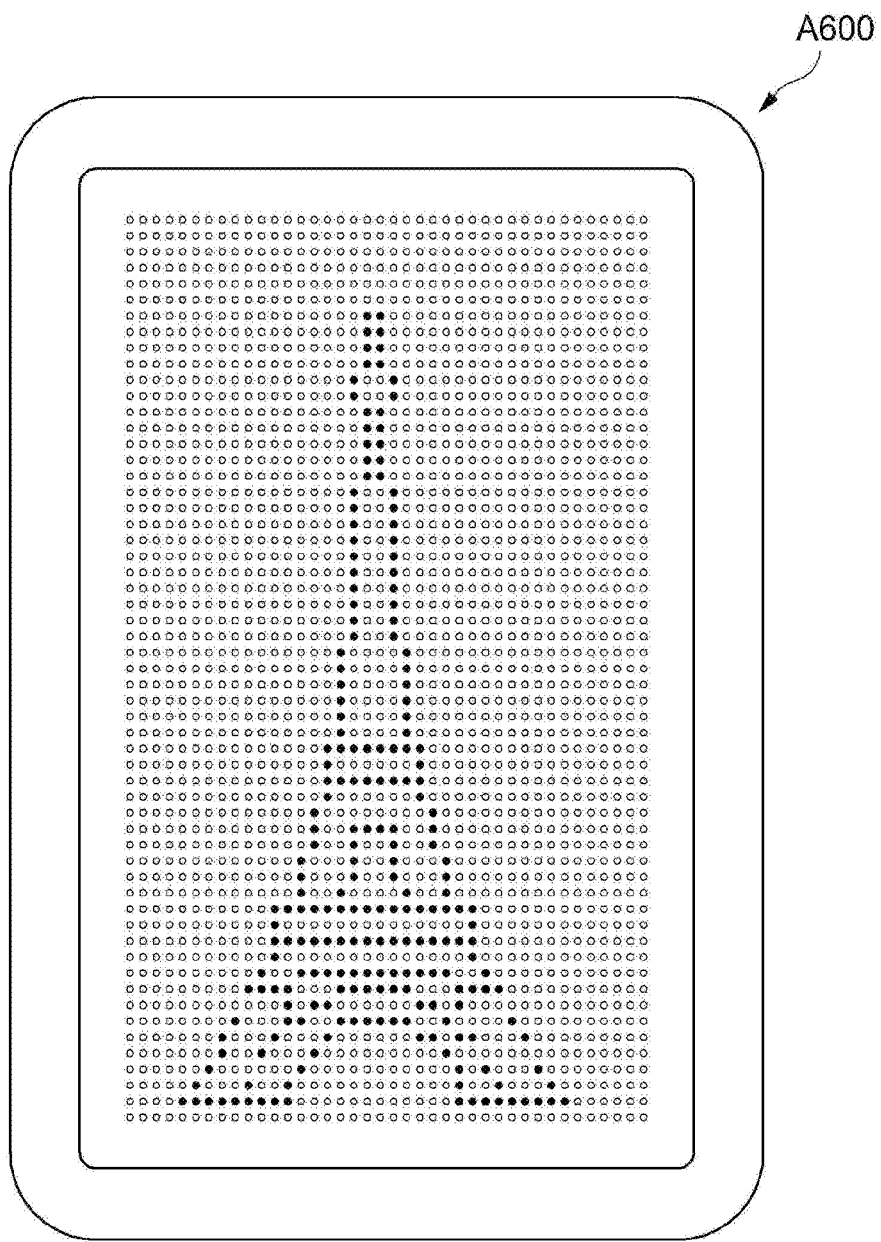
FIGS. 6A and 6B are diagrams illustrating a configuration of a braille outputting device using a braille actuator according to an exemplary embodiment of the present invention.
Figure 6B:
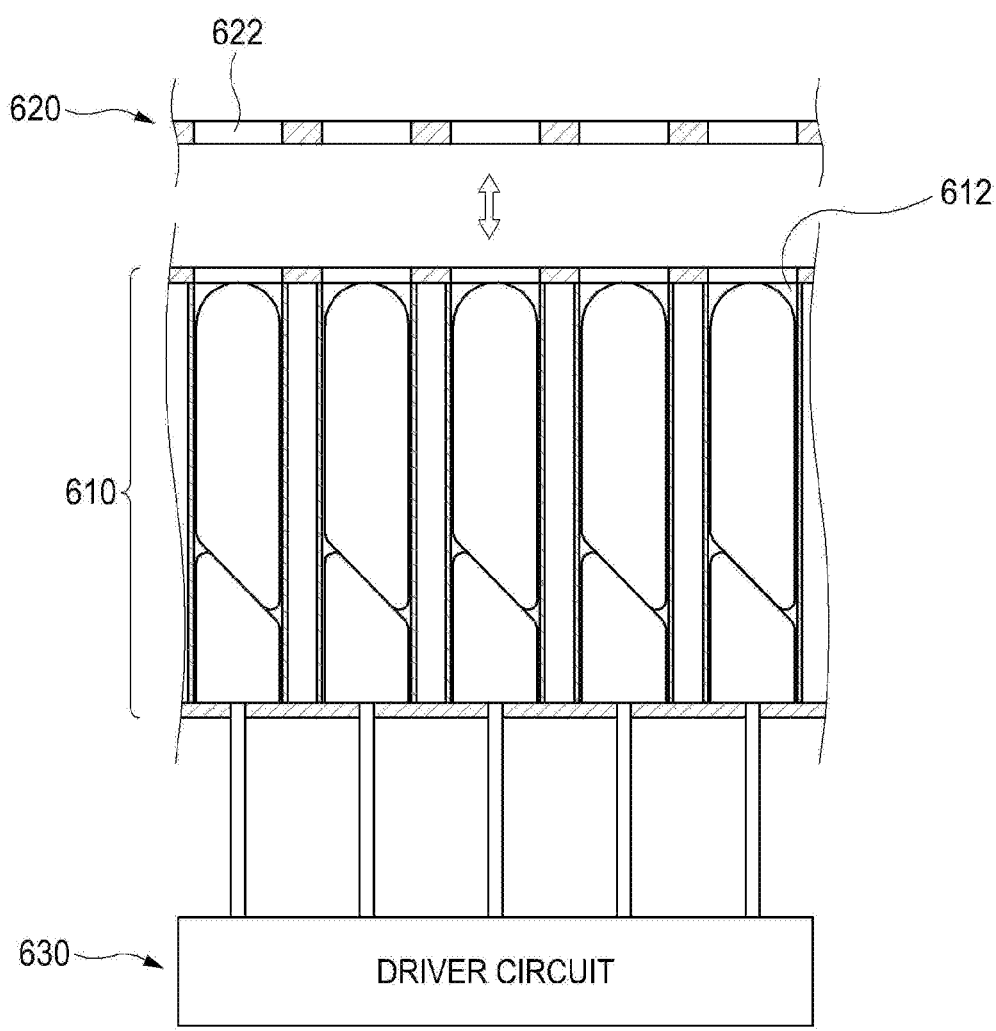

FIGS. 6A and 6B are diagrams illustrating a configuration of a braille outputting device 600 using a braille actuator according to an exemplary embodiment of the present invention.

Referring to FIGS. 6A and 6B, the braille outputting device 600 according to the present invention is configured to include a base 610, a cover 620, and a driver circuit 630.

In the base 610, a plurality of cells 612, each having one braille actuator according to an exemplary embodiment of the present invention, are formed, and one braille actuator is installed in each of the cells 612.

Braille holes 622 are formed on the cover 620 so that the braille protrusions 200 can be protruded from the cover 620, and the cover is engaged with the base 610 to prevent the entire braille actuators from flowing out.

The driver circuit 630 supplies a current to the electromagnets 400 of the braille actuators installed in the cells 612 according to information to be output to the user to control the braille actuators installed in the cells 612. The driver circuit 630 may be installed inside the base 610.

The present invention has been described with reference to the exemplary embodiments. It will be understood by those skilled in the art that various changes in form and details may be made therein without departing from the spirit and scope of the invention as defined by the claims. Therefore, the disclosed embodiments should be considered in an illustrative sense rather than a restrictive sense. The scope of the present invention is defined by the claims rather than by the foregoing description, and all differences within the scope of equivalents thereof should be construed as being included in the present invention.

The invention claimed is:

1. A braille actuator comprising:
a rotation driving member which generates a rotational force of a rotation member according to a flow of current;
a rotation member which has an upper surface formed to be an inclined surface and is rotated by the rotational force generated by the rotation driving member; and
a braille protrusion which has a lower surface formed to be an inclined surface so as to be in contact with the inclined surface of the rotation member and which is moved upward or downward along the inclined surface of the rotation member when the rotation member is rotated.

2. The braille actuator according to claim 1, wherein a guide member is formed on a side surface of the braille protrusion so as to prevent rotation of the braille protrusion and allow the braille protrusion to perform only upward and downward movement.

3. The braille actuator according to claim 2, further comprising a housing for accommodating the rotation member and the braille protrusion,
wherein a guide hole is formed in the longitudinal direction at a position corresponding to the guide member of the housing to be engaged with the guide member.

4. The braille actuator according to claim 1, wherein the rotation member is rotated by 180 degrees.

5. The braille actuator according to claim 1,
wherein the rotation driving member is configured with an electromagnet of which polarity is changed according to the flow of current, and
a rotation member has a lower surface on which a permanent magnet is installed and is rotated by an attractive force or a repulsive force being exerted between the permanent magnet and the electromagnet.

6. The braille actuator according to claim 5, wherein a sum of circumferential lengths of the electromagnet and the permanent magnet is 50% of a circumferential length of the rotation member.

7. The braille actuator according to claim 1, wherein cut surfaces are horizontally formed at a highest point of the upper surface of the rotation member and a lowest point of the lower surface of the braille protrusion so that the cut surface of the rotation member and the cut surface of the braille protrusion are in contact with each other to be supported in the state where the braille protrusion is protruded.

8. The braille actuator according to claim 1, further comprising a center shaft passing through a center of the rotation member and the braille protrusion.

9. The braille actuator according to claim 1, wherein an edge of the upper surface of the rotation member and an edge of a lower surface of the braille protrusion are formed to be rounded.

10. The braille actuator according to claim 1,
wherein the rotation member and the braille protrusion are formed in a cylindrical shape, and
wherein the electromagnet and the permanent magnet are arranged in a circular shape along a circumference of a cross section of the rotation member.

11. The braille actuator according to claim 10,
wherein the electromagnet is configured to include a first electromagnet and a second electromagnet, and
wherein a current is supplied to the first electromagnet and the second electromagnet so that the surfaces facing each other and the surfaces opposite to each other have the same polarities.

12. A braille outputting device comprising:
a base where a plurality of cells are formed;
such that installed in each of the cells that is a braille actuator comprising,
a rotation driving member which generates a rotational force of a rotation member according to a flow of current;
a rotation member which has an upper surface formed to be an inclined surface and is rotated by the rotational force generated by the rotation driving member; and
a braille protrusion which has a lower surface formed to be an inclined surface so as to be in contact with the inclined surface of the rotation member and which is moved upward or downward along the inclined surface of the rotation member when the rotation member is rotated:
a cover which is engaged with the base; and
a driver circuit which supplies a current to the driving member of the braille actuator installed in each of the cells according to information to be output to a user and controlling the braille actuator installed in each of the cells.

* * * * *